May 5, 1959 B. S. PARMET ET AL 2,885,468
COLOR OSCILLATOR SYNCHRONIZATION SYSTEM
Original Filed Aug. 10, 1953
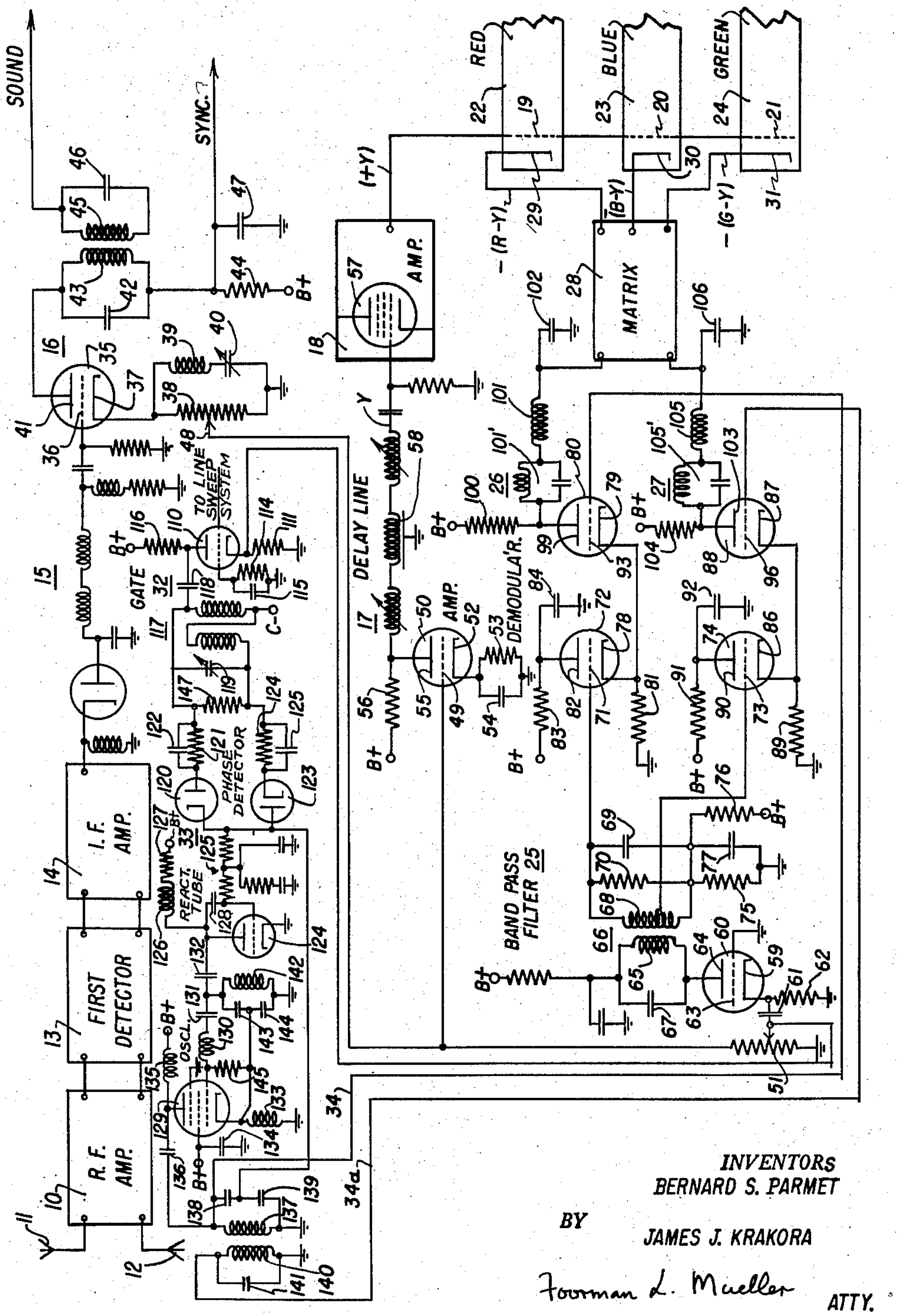
INVENTORS
BERNARD S. PARMET
BY
JAMES J. KRAKORA
Foorman L. Mueller
ATTY.

United States Patent Office 2,885,468

Patented May 5, 1959

2,885,468

COLOR OSCILLATOR SYNCHRONIZATION SYSTEM

Bernard S. Parmet, Phoenix, Ariz., and James J. Krakora, Jr., Chicago, Ill., assignors to Motorola, Inc., Chicago, Ill., a corporation of Illinois Application June 12, 1958, Serial No. 741,987

4 Claims. (Cl. 178—5.4)

This invention relates to color television receivers and more particularly to color television receivers for use in color television systems of the type in which monochrome video information is transmitted as a modulation component of a picture carrier, and in which chroma information is transmitted on sub-carrier components of the picture carrier. This application is a continuation of application Serial No. 373,356, filed August 10, 1953, now abandoned.

One known color television system is referred to in present-day art as the "NTSC system," and this system is described in an article by C. J. Hirsch et al., entitled "Principles of NTSC Compatible Color Television," page 88 of Electronic Magazine, published by McGraw-Hill Corporation, in February 1952 edition. In this type of color television system, the transmitted color television signal includes monochrome ($y$) video information, amplitude modulated on a picture carrier; and also includes two independent sub-carrier components of the picture carrier respectively modulated by blue and red color difference information ($b-y$) and ($r-y$). These sub-carrier components are of like frequency but are in phase quadrature with each other and amplitude modulated with the aforementioned color difference information. It is usual also to include bursts of a reference signal component in the television signal having the frequency of the sub-carriers and in phase with one of them.

There is provided in each color television receiver in the NTSC system, a cathode-ray image reproducing device for the red color information, a similar device for the green color information, and a similar device for the blue color information. These devices may be in separate envelopes or may all be included in a common envelope. The monochrome ($y$) information is recovered from the NTSC color television signal and is applied to the control electrodes of the three image reproducing devices. The first color difference signal ($r-y$) is recovered from one of the aforementioned subcarrier components, and this signal is applied to the cathode of the red image reproducing device so that the resulting modulation on the cathode-ray beam therein is in accordance with red color information. Likewise, the second color difference signal ($b-y$) is recovered from the second sub-carrier component and is supplied to the cathode of the blue image reproducing device so that the resulting modulation in the latter device is in accordance with blue color information. The two color difference signals referred to above are combined to produce a green ($g-y$) color difference signal, and this signal is applied to the cathode of the green image reproducing device so that the resulting modulation in that device is in accordance with the green color information. The resulting color images appearing on the screens of the three reproducing devices are then combined optically to produce a picture in full color.

Some measure of cross-talk was found to occur between the different color-difference signals in the early NTSC systems, and to correct this the phase of the ($r-y$) sub-carrier was inverted from time to time. However, in later NTSC systems it has been found that by proper choice of frequency and band-width of the ($r-y$) and ($b-y$) color sub-carriers, satisfactory color reproduction may be achieved without noticeable cross-talk and without the necessity for inverting the phase of either of the color sub-carrier components.

Another system, essentially similar to the above, has been devised in which cross-talk is reduced to a minimum without the need to invert the phase of the color sub-carrier components from time to time. In the latter system, the aforementioned sub-carrier components are modulated in accordance with orange and negative green (cyan) color information instead of the aforementioned ($r-y$) and ($b-y$) color difference signals. Matrices are provided in the orange-cyan color television receivers which utilize the orange-cyan signals obtained by demodulating the sub-carrier components again to produce the ($b-y$) ($r-y$) ($g-y$) color difference signals for application to the three image reproducing devices referred to previously herein.

The present invention is directed to that section of a color television receiver utilized for demodulating the previously described color sub-carrier components, and may be applied equally to the various NTSC systems or to the orange-cyan system.

It is a general object of the present invention to provide an improved color television receiver for operation in the color television systems referred to above, and which includes efficient and simplified networks for demodulating the sub-carrier components of the aforementioned color television signal and for producing the desired color information in response thereto.

A further object of the invention is to provide such an improved color television receiver that operates efficiently to reproduce images in full color and yet which utilizes relatively simple networks incorporating relatively inexpensive components.

A feature of the invention is the provision of an improved network for selecting control bursts from a received color television signal, for utilizing such bursts to produce a pair of continuous waves each having a selected frequency and phase with respect to the color sub-carrier components, and for supplying such continuous waves to the respective color demodulators to enable them to recover the chroma information.

Another feature of the invention is the provision of such an improved selecting network that includes an improved and unique gated amplifier stage for selecting the control bursts from the color television signal.

A further feature of the invention is the provision of such an improved selecting network in which the continuous waves are produced by an oscillator circuit that includes a pentode discharge device synchronized with the control bursts from the color television signal and incorporating inherent amplification for the continuous wave produced by the oscillator due to electron coupling within the pentode.

The above and other features of the invention which are believed to be new are set forth with particularity in the appended claims. The invention itself, however, together with further objects and advantages thereof, may best be understood by reference to the following description when taken in conjunction with the accompanying drawing in which the single figure shows a color television receiver constructed in accordance with the invention.

The receiver illustrated in the drawing is intended to operate in the orange-cyan type of system. However, as previously pointed out, the invention is directed to that portion of the receiver which may be used either in the orange-cyan or various types NTSC systems.

The receiver includes a radio frequency amplifier 10 having input terminals connected to an antenna circuit 11, 12 and having output terminals coupled through a first detector 13 to an intermediate frequency amplifier 14. Amplifier 14 is coupled through a second detector designated generally as 15 to an amplifier 16. Amplifier 16 is coupled to a further amplifier 17 which, in turn, is coupled through an amplifier 18 to the control electrodes 19, 20 and 21 of cathode-ray image reproducing devices 22, 23 and 24. Reproducing device 22 is constructed to reproduce the red image; whereas reproducing devices 23 and 24 are constructed to reproduce the blue and green images respectively. The resulting images from the aforementioned reproducing devices may be combined optically to reproduce the televised scene in full color.

Amplifier 16 is also coupled through a band-pass filter 25 to a demodulator 26 and to a demodulator 27. Demodulators 26, 27 are coupled through a matrix 28 to the respective cathodes 29, 30 and 31 of reproducing devices 22, 23 and 24. Amplifier 16 is also coupled through a gate 32 to a continuous-wave restorer 33 and the output terminals of restorer 33 are connected respectively to demodulator 26 and to demodulator 27.

The color television signal of the orange-cyan type includes (in addition to the monochrome video, synchronizing and sound components) a pair of chroma-modulated sub-carrier components of like frequency but in phase quadrature relation, and the television signal also includes bursts of a reference signal component having the frequency and phase of one of the sub-carrier components. The sub-carrier components are amplitude-modulated respectively in accordance with orange (I) and cyan (Q) color information.

A color television signal such as that described above may be intercepted by antenna circuit 11, 12 and amplified by radio frequency amplifier 10. The amplified signal from amplifier 10 is heterodyned to the selected intermediate frequency of the receiver in first detector 13, and the resulting intermediate frequency signal is amplified in amplifier 14 and demodulated in second detector 15. The demodulated signal is amplified in amplifier 16 which supplies the sound and synchronizing components thereof to the appropriate channels of the receiver. Amplifier 16 also supplies the monochrome video ($y$) components to amplifier 17 and thence through amplifier 18 to the control electrodes 19, 20 and 21 of the image reproducers 22–24. Amplifier 16 also supplies the aforementioned chroma sub-carrier components to band-pass filter 25 which selects both sub-carrier components and supplies them to demodulators 26 and 27.

Gate 32 selects the aforementioned bursts of reference signal and supplies such bursts to restorer 33. The latter unit responds to these bursts to produce a continuous-wave signal having the frequency and phase of the reference signal component. The resulting continuous-wave signal is supplied directly over lead 34 to demodulator 26 where it is used to demodulate the orange (I) color information from the aforementioned orange sub-carrier component. In addition, the continuous wave from unit 33 is phase-shifted 90°, and the phase-shifted signal is supplied over lead 34*a* to demodulator 27 to recover the cyan (Q) color information from the other sub-carrier component. The orange (I) and cyan (Q) color signals from demodulators 26, 27 are supplied to matrix 28 which includes well known adder and subtracter networks for recovering the $(r-y)$, $(b-y)$ and $(g-y)$ color difference signals from the (I) and (Q) signals. The color difference signals are supplied respectively to cathodes 29, 30 and 31 of the image reproducers and cooperate with the monochrome signal on the control electrodes thereof in known fashion so that each image reproducer reproduces its appropriate color image.

Amplifier 16 includes an electron discharge device 35 having a control electrode 36 coupled to the second detector 15. Device 35 also has a cathode 37 connected to ground through an impedance network including a resistor 38 with a series-resonant circuit in shunt therewith including an inductance coil 39 and capacitor 40. Device 35 further has an anode 41 which is connected to B+ through a parallel-tuned circuit including capacitor 42 and inductance coil 43 and through a series-connected resistor 44, the resistor being bypassed to ground by a capacitor 47 for the higher video frequencies and the intercarrier frequency. A further resonant network including an inductance coil 45 and capacitor 46 is inductively coupled to resonant network 42, 43. Both networks 42, 43 and 45, 46 are tuned to the intercarrier frequency; so that the intercarrier signal, frequency modulated by the sound information, is obtained across network 45, 46 for application to the sound channel. The synchronizing components of the demodulated signal are derived across resistor 44 for application to the synchronizing channel.

Resonant circuit 39, 40 is tuned to the intercarrier frequency so that amplifier 16 is not degenerative at the intercarrier frequency to enable the intercarrier signal to be fed to the sound channel with maximum gain, and also to prevent any portion of the intercarrier signal from being fed to the chroma channel of the receiver. Resistor 38 has a movable tap 48 thereon to control picture contrast and which is connected to the control electrode 49 of an electron discharge device 50 constituting amplifier 17, and which is also connected to ground through a resistor 51.

Discharge device 50 has a cathode 52 connected to ground through a cathode resistor 53 shunted by a capacitor 54, and the device has an anode 55 connected to the positive terminal B+ through a load resistor 56. Anode 55 is coupled to the control electrodes of an electron discharge device 57 included an amplifier 18 through an appropriate delay line 58 and, in this manner, the monochrome ($y$) video components derived across cathode resistor 38 are amplified in device 50 and supplied to further amplifier 18 for application to the aforementioned control electrodes 19–21 of the image reproducers 22–24. Delay line 58 is provided to compensate for delays suffered by the aforementioned color sub-carrier components and their modulation products in the chroma channel of the receiver.

Resistor 51 has a chroma adjustment tap thereon which is coupled to the cathode 59 of an electron discharge device 60 through a coupling capacitor 61, cathode 59 being connected to ground through a resistor 62. The control electrode 63 of discharge device 60 is connected to ground and the anode 64 of this device is connected to the positive terminals B+ through the primary winding 65 of a transformer 66 and through a suitable series-connected voltage dropping resistor. Discharge device 60 constitutes a portion of band-pass filter 25 and functions as a grounded grid amplifier. In this manner, the chroma components passed by the band-pass filter to the chroma channel of the receiver are additionally amplified, the amplifier 60 accomplishing this efficiently without feed-back.

Primary winding 65 of transformer 66 is shunted by a capacitor 67. Transformer 66 has a secondary winding 68 which is shunted by a capacitor 69 and which has a damping resistor 70 connected thereacross. The elements 65, 67, 68, 69 and 70 have selected parameters to provide the necessary band-pass characteristics for the filter so that the color subcarrier components and all their modulation side bands will be passed thereby.

The high-voltage side of winding 68 is connected to the control electrode 71 of an electron discharge device 72 in demodulator 26, and a tap on secondary winding 68 is connected to the control electrode 73 of an electron discharge device 74 in demodulator 27. The lower side of winding 68 is connected to the common junction of a pair of resistors 75 and 76, the latter resistors being connected as a potentiometer between B+ and ground to provide a positive bias for control electrodes 71 and 73. Resistor 75 is shunted by a bypass capacitor 77 so that the lower side of winding 68 is established at ground potential for A.C. current.

The cathode 78 of discharge device 72 is connected to the cathode 79 of a further electron discharge device 80 in demodulator 26, and these cathodes are connected to ground through a common resistor 81. The anode 82 of discharge device 72 is connected to B+ through a load resistor 83 and is bypassed to ground through a capacitor 84 so that discharge device 72 functions as a grounded plate amplifier.

The cathode 86 of discharge device 74 is connected to the cathode 87 of a further electron discharge device 88 in demodulator 27, and these cathodes are connected to ground through a common resistor 89. The anode 90 of discharge device 74 is connected to B+ through a load resistor 91, and the anode is bypassed to ground through a capacitor 92, so that device 74 also functions as a grounded plate amplifier.

Control electrode 93 of discharge device 80 is coupled to restorer 33 through lead 34, and control electrode 96 of discharge device 88 is coupled to the restorer through lead 34*a*.

Device 80 has an anode 99 connected to B+ through anode resistor 100, and the anode is coupled to an input terminal of matrix 28 through an inductance coil 101 and a trap circuit 101′, the side of inductance coil remote from anode 99 being coupled to ground through a capacitor 102. The anode 103 of device 88 is connected to B+ through a load resistor 104, and the latter anode is coupled to another input terminal of matrix 28 through an inductance coil 105 and trap circuit 105′, the side of inductance coil 105 remote from anode 103 being coupled to ground through a capacitor 106. Trap circuits 101′ and 105′ are tuned to 3.58 megacycles to remove the color sub-carrier components from demodulated products appearing at the anodes of devices 80 and 88.

Band-pass filter 25 supplies the sub-carrier components to the control electrodes 71 and 73 of respective devices 72 and 74. These sub-carrier components are translated by devices 72 and 74, which function as isolation buffer stages, and are impressed on the cathodes 79 and 87 of respective devices 80 and 88. The reference signal from restorer 33 is applied directly to control electrode 93 of device 80 and is in phase with the sub-carrier component bearing the orange color information. Therefore, the control signal on control electrode 93 gates device 80 on at the instant each cycle of the orange sub-carrier component is at optimum carrier amplitude so that the modulation components of the sub-carrier are translated by device 80 and supplied to matrix 28. The control signal from restorer 33, on the other hand, is in phase quadrature with the sub-carrier component bearing the cyan information and device 80 is turned on at the instant each cycle of the latter sub-carrier component passes through zero A.C. axes so that none of its modulation components is translated by device 80. Device 80, therefore, in response to the control signal from restorer 33, translates only the orange (I) demodulation components to matrix 28.

Device 88, on the other hand, is keyed by the 90° phase shifted control signal from unit 33, and functions in the same manner as device 80 but to translate the cyan (Q) demodulation components derived from the cyan sub-carrier component impressed on its cathode 87 by device 74. Device 88, therefore, supplies only the cyan modulation components to matrix 28. The modulation components derived from devices 80 and 88 are mixed in matrix 28 in known manner to produce the desired $(b-y)$ $(r-y)$ $(g-y)$ color difference signals.

Since the sub-carrier components are, in each instance, supplied to control electrodes 71 and 73 of devices 72 and 74, and thence, to cathodes 79 and 87 of devices 80 and 88, there is no inter-action between the sub-carrier components and the control signals applied respectively to control electrodes 93 and 96 of the latter devices. Likewise, there can be no inter-action between the control signals applied to control electrodes 93 and 96 of devices 80 and 88, and the sub-carrier components applied to the control electrodes 71 and 73 of devices 72 and 74.

When it is desired for the receiver to operate in the NTSC type of system, it is merely necessary for matrix 28 to be designed to recover the $(g-y)$ color difference signal from the $(r-y)$ and $(b-y)$ color difference signals, the latter two color difference signals being derived directly from demodulators 26 and 27. Also, the desired amplitude relation between the $(b-y)$ and $(r-y)$ signals from demodulators 26 and 27 can be achieved merely by adjusting the tap on secondary 68 of transformer 66 which is connected to control electrode 73 of device 74. The desired amplitude proportion between the orange and cyan modulation components in the orange-cyan system can be obtained in the same way merely by the proper location of the aforementioned tap on winding 68.

The gate 32 includes an electron discharge device 110 having a cathode connected to ground through a resistor 111. The cathode is also connected to the movable tap on potentiometer 51 to derive the detected color television signal. Device 110 also has a control electrode connected to ground through a resistor 114 shunted by a capacitor 115, the control electrode being further coupled to the line sweep system of the receiver to derive positive polarity line retrace blanking pulses therefrom. The anode of device 110 is connected to the positive terminal B+ through a resistor 116 and is coupled to the primary winding of a bifilar transformer 117 through a capacitor 118.

The color control bursts of the detected color television signal applied to the cathode of device 110 are interposed on the back porch of the line blanking pulses, and the line retrace blanking pulses applied to the control electrode of device 110 render that device conductive during the intervals of such bursts so that only the bursts are translated thereby. In so far as the color control bursts are concerned, the control electrode of device 110 is bypassed to ground by capacitor 115, and the device functions as a grounded-grid amplifier. In this manner, device 110 not only provides a gate for the color control bursts, but also functions as an efficient amplifier for such bursts.

The transformer 117 is tuned by a capacitor 119 to the frequency of the amplified color control bursts from gate 32. The transformer is connected to the anode of a diode 120 through a resistor 121 shunted by a capacitor 122, and the transformer is also connected to the cathode of a diode 123 through a resistor 124 shunted by a capacitor 125. Diodes 120, 123 are included in the continuous wave restorer 33. The cathode of diode 120 is connected to the anode of diode 123, and these electrodes are connected to the control electrode of a reactance tube 124 (also included in continuous wave restorer 33) through a usual resistance capacity integrating circuit 125. The cathode of reactance tube 124 is connected to ground and its anode is connected to the positive terminal B+ through a choke coil 126 and resistor 127. The anode is also coupled to the control electrode through a capacitor 128.

Continuous wave restorer 33 also includes an oscillator pentode discharge device 129, which has a control electrode coupled to the anode of reactance tube 124 through a choke coil 130 and a pair of series capacitors 131 and 132. Device 129 also has a cathode connected to ground through a choke coil 133, a screen electrode connected to the positive terminal B+ and bypassed to ground through capacitor 134 at the frequency of the color control bursts, and a suppressor electrode connected to ground.

The anode of device 129 is coupled to the positive terminal B+ through a choke coil 135, and the anode is further coupled through a capacitor 136 to a resonant network including an inductance coil 137 shunted by a pair of capacitors 138, 139 and tuned thereby to the frequency of the color control bursts. Lead 34 is connected to the junction between the capacitor 136 and the resonant circuit, and the junction between capacitors 138, 139 is connected to the cathode of diode 120 and to the anode of diode 123. An inductance coil 140 is inductively coupled to coil 137, and coil 140 is shunted by a capacitor 141 which tunes it to the frequency of the color control bursts. Lead 34*a* is connected to the upper junction of coil 140 and capacitor 141. A frequency determining network for the oscillator is connected between the junction of capacitors 131, 132 and ground, the network includes an inductance coil 142 shunted by a pair of capacitors 143, 144. The junction of capacitors 143, 144 is connected to the cathode of oscillator discharge device 129.

The frequency determining network 142–144 is tuned to the frequency of the color control bursts causing the oscillator section of device 129 to generate a continuous wave of that frequency. Such wave is amplified in the device 129 by electron coupling, and an amplified continuous wave of the frequency of the color control bursts appears across network 137–139 and on lead 34. A portion of this continuous wave signal is fed back to the diodes 120, 123, and this signal is compared with the amplified bursts from gate 32 in the phase detector circuit of the diodes to produce a control signal across circuit 125. This control signal has amplitude variations corresponding to phase variations between the continuous wave produced across network 137–139 and the color control bursts. The illustrated connection of transformer 117 is a convenient means for supplying the bursts from gate 32 to the respective diodes in phase opposition for proper phase detector action in the diode circuit. A negative bias is provided for the diodes and reactance tube 124 by the connection of the bottom of the primary winding and top of the secondary winding of the transformer to a negative terminal C—.

The control signal referred to above is applied to the control electrode of reactance tube 124 and causes this tube to control network 142–144 so that the frequency and phase of the continuous wave signal produced by the oscillator is precisely that of the color control bursts.

Network 140, 141 coupled to network 137–139 produces a continuous wave signal identical to that developed in the latter network but in phase quadrature therewith, and this phase quadrature continuous wave signal is supplied to lead 34*a* for the purposes described previously herein.

The operation of the phase detector and reactance tube portions of the continuous wave restorers 33 in themselves are believed to be sufficiently well understood to the art so as to render a detailed description herein unnecessary.

The invention provides, therefore, an improved and relatively simple color television receiver that may be operated in the NTSC or orange-cyan type of color television system and which incorporates relatively simple circuit networks for demodulating the color sub-carrier components and for deriving the necessary color information.

While a particular embodiment of the invention has been shown and described, modifications may be made and it is intended in the appended claims to cover all such modifications as fall within the true spirit and scope of the invention.

We claim:

1. In a color television receiver for utilizing a color television signal which includes synchronizing components, which also includes a pair of subcarrier components of like frequency and having a predetermined phase relation and each modulated with different color information, and which further includes bursts of a reference signal having a predetermined frequency and phase relation with the subcarrier components, said bursts recurring at predetermined intervals which have a selected timing with respect to the synchronizing components of the color television signal, and which receiver includes a detector for deriving the color television signal, the combination including, a triode discharge device having an anode, a cathode, and a control electrode, means for impressing said color television signal from the detector on said cathode, means responsive to the synchronizing components for impressing on said control electrode a series of positive-going gating pulses which occur at the time of the bursts and render said discharge device conducting, capacitor means for bypassing said control electrode to a point of reference potential at the frequency of the reference signal bursts, a generating network for producing a continuous wave output signal, a balanced phase detector for comparing the output signal from said generating network with said reference signal burst translated by said triode to produce a control signal, a phase splitting transformer connected to said anode for applying balanced bursts to said phase detector, said generating network including a second electron discharge device having an anode, a cathode, and a plurality of control electrodes, an oscillator section including said cathode and at least one of said control electrodes of said second discharge device, means utilizing said control signal to synchronize the frequency and phase of said oscillator with that of said bursts, and an amplifier section including said anode of said second electron device, said amplifier section being electron coupled to said oscillator section and including output transformer means connected to said anode of said second discharge device and providing first and second output signals having the same phases as the subcarrier components, whereby said amplifier produces continuous wave signals having selected frequency and phase relations with said subcarrier components.

2. In a color television receiver for utilizing a color television signal which includes synchronizing components, which also includes a pair of subcarrier components of like frequency and having a predetermined phase relation and each modulated with different color information, and which further includes bursts of a reference signal having a predetermined frequency and phase relation with the subcarrier components, said bursts recurring at predetermined intervals which have a selected timing with respect to the synchronizing components of the color television signal, and which receiver includes a detector for deriving the color television signal, the combination including, gating means, means for applying said color television signal from the detector to said gating means, means responsive to the synchronizing components for applying to said gating means gating pulses which occur at the time of the bursts so that the bursts in the detected signal are translated by said gating means, a generating network for producing a continuous wave output signal, a balanced phase detector for comparing the output signal from said generating network with said reference signal burst translated by said gating means to produce a control signal, a phase splitting transformer connected to said gating means for applying from said gating means balanced bursts to said phase detector, said generating network including a second electron discharge device having an anode, a cathode and a plurality of control electrodes, an oscillator section including said cathode and at least one of said control electrodes of said second discharge device, reactance tube means coupled to said phase detector and to said oscillator for utilizing said control signal to synchronize the frequency and phase of said oscillator with that of said bursts, and an amplifier section including said anode of said second electron device, said amplifier section being electron coupled to said oscillator section and including output transformer means connected to said anode of said second discharge device and providing first and second output signals having the same phases as the subcarrier components, whereby said amplifier produces continuous wave signals having selected frequency and phase relations with said subcarrier components.

3. In a color television receiver for utilizing a color television signal which includes a pair of subcarrier components of like frequency and having a predetermined phase relation and each modulated with different color information, and which signal also includes synchronizing components and bursts of a reference signal having a predetermined frequency and phase relation with the subcarrier components, with the bursts recurring at predetermined intervals which have a selected timing with respect to the synchronizing components, and which receiver includes a detector for deriving the color television signal, the combination including, a triode discharge device having first and second input electrodes and an output electrode, means for impressing said color television signal from the detector on one of said input electrodes, means responsive to the synchronizing components for impressing on the other of said input electrodes a series of positive-going gating pulses which occur at the time of the bursts and render said discharge device conducting, a generating network for producing a continuous wave output signal, a balanced phase detector for comparing the output signal from said generating network with said reference signal burst at said output electrode of said triode to produce a control signal, a phase splitting transformer connected to said output electrode for applying balanced bursts to said phase detector, said generating network including a second electron discharge device having an anode, a cathode, and a plurality of control electrodes, an oscillator section including said cathode and at least one of said control electrodes of said second discharge device, means utilizing said control signal to synchronize the frequency and phase of said oscillator with that of said bursts, and an amplifier section including said anode of said second electron device, said amplifier section being electron coupled to said oscillator section and including output transformer means connected to said anode of said second discharge device and providing first and second output signals having the same phases as the subcarrier components, whereby said amplifier produces continuous wave signals having selected frequency and phase relations with said subcarrier components.

4. In a color television receiver for utilizing a color television signal which includes a pair of subcarrier components of like frequency and having a predetermined phase relation and each modulated with different color information, and which signal also includes synchronizing components and bursts of a reference signal having a predetermined frequency and phase relation with the subcarrier components, with the bursts recurring at predetermined intervals which have a selected timing with respect to the synchronizing components, and which receiver includes a detector for deriving the color television signal, the combination including, gating means, means for applying said color television signal from the detector to said gating means, means responsive to the synchronizing components for applying to said gating means gating pulses which occur at the time of the bursts so that the bursts in the detected signal are translated by said gating means, a generating network for producing a continuous wave output signal, phase detector means for comparing the output signal from said generating network with said reference signal burst translated by said gating means to produce a control signal, means for applying to said phase detector means said bursts translated by said gating means, said generating network including a second electron discharge device having an anode, a cathode, and a plurality of control electrodes, an oscillator section including said cathode and at least one of said control electrodes of said second discharge device, reactance tube means coupled to said phase detector means and to said oscillator for utilizing said control signal to synchronize the frequency and phase of said oscillator with that of said bursts, and an amplifier section including said anode of said second electron device, said amplifier section being electron coupled to said oscillator section and including output means connected to said anode of said second discharge device, said output means including phase shifting means providing first and second output signals having the same phase relation therebetween as the phase relation between the subcarrier components, whereby said amplifier produces continuous wave signals having selected frequency and phase relations with said subcarrier components.

References Cited in the file of this patent

UNITED STATES PATENTS

| | | |
|---|---|---|
| 2,751,430 | Kelly | June 19, 1956 |
| 2,802,045 | Landon | Aug. 6, 1957 |
| 2,848,529 | Werenfels | Aug. 19, 1958 |
| 2,857,456 | Humphrey | Oct. 21, 1958 |